US012574927B2

(12) United States Patent
Nhan et al.

(10) Patent No.: US 12,574,927 B2
(45) Date of Patent: Mar. 10, 2026

(54) IMPLICIT USER EQUIPMENT PROCESSING TIME INDICATION AND DETERMINATION FOR SUPPORT OF DIFFERENT PROCESSING TIMES IN ULTRA-RELIABLE LOW-LATENCY COMMUNICATION (URLLC)

(71) Applicant: NOKIA TECHNOLOGIES OY, Espoo (FI)

(72) Inventors: Nhat-Quang Nhan, Reims (FR); Sigen Ye, Whitehouse Station, NJ (US); Klaus Hugl, Vienna (AT)

(73) Assignee: NOKIA TECHNOLOGIES OY, Espoo (FI)

( * ) Notice: Subject to any disclaimer, the term of this patent is extended or adjusted under 35 U.S.C. 154(b) by 787 days.

(21) Appl. No.: 17/774,363

(22) PCT Filed: Nov. 5, 2020

(86) PCT No.: PCT/IB2020/060410
§ 371 (c)(1),
(2) Date: May 4, 2022

(87) PCT Pub. No.: WO2021/090226
PCT Pub. Date: May 14, 2021

(65) Prior Publication Data
US 2022/0369342 A1       Nov. 17, 2022

Related U.S. Application Data

(60) Provisional application No. 62/932,781, filed on Nov. 8, 2019.

(51) Int. Cl.
H04W 72/1273 (2023.01)
H04W 72/1268 (2023.01)
H04W 72/23 (2023.01)

(52) U.S. Cl.
CPC ... H04W 72/1273 (2013.01); H04W 72/1268 (2013.01); H04W 72/23 (2023.01)

(58) Field of Classification Search
CPC ......... H04W 72/1273; H04W 72/1268; H04W 72/23; H04W 8/22; H04W 88/06; H04W 72/12
See application file for complete search history.

(56) References Cited

PUBLICATIONS

Qualcomm, "Summary of Email Discussion [98-NR-15] on Downlink Out-of-Order", R1-1911504, 3GPP TSG RAN WG1 #98, Aug. 26-30, 2019. (Year: 2019).*
Qualcomm Incorporated, "Summary #4 of Enhancements to Scheduling/HARQ", R1-1911708, 3GPP TSG-RAN WG1 Meeting #98b , Oct. 14-20, 2019. (Year: 2019).*
International Search Report and Written Opinion dated Jan. 27, 2021 corresponding to International Patent Application No. PCT/IB2020/060410.

(Continued)

*Primary Examiner* — Khoa Huynh
(74) *Attorney, Agent, or Firm* — Barta Jones, PLLC

(57)       ABSTRACT
Systems, methods, apparatuses, and computer program products for supporting different downlink and/or uplink processing times on a serving cell are provided. This can be used, for example, to support mixed enhanced mobile broadband (eMBB) and/or ultra-reliable low-latency communication (URLLC) traffic on the cell.

4 Claims, 4 Drawing Sheets

(56) References Cited

PUBLICATIONS

Qualcomm Incorporated, "Summary #4 of Enhancements to Scheduling/HARQ," 3GPP Draft, R1-1911708, 3GPP TSG-RAN WG1 meeting #98b, Chongqing, China, Oct. 14-20, 2019, Oct. 22, 2019, XP051798950.

Qualcomm, "Summary of Email Discussion [98-NR-15] on Downlink Out-of-Order," 3GPP Draft; R1-1911504, 3GPP TSG RAN WG1 #98, Prague, Czech Republic, Aug. 26-30, 2019, Oct. 22, 2019, XP051798769.

Qualcomm, "Summary #3 of Email discussion regarding the out-of-order HARQ issue," 3GPP Draft, R1-1907925, 3GPP TSG RAN WG1 Meeting #96b, Xi'an, China, Apr. 8-12, 2019.

Huawei et al., "New WID: Physical Layer Enhancements for NR Ultra-Reliable and Low Latency Communication (URLLC)," 3GPP Draft, R1-190726, 3GPP TSG RAN Meeting #83, Shenzhen, China, Mar. 18-21, 2019.

Office action received for corresponding European Patent Application No. 20807889.9, dated Sep. 18, 2024, 7 pages.

* cited by examiner

Determining a threshold used for determining processing time capability for UE(s) ——300

Informing the UE(s) about the threshold used for determining the processing time capability for the UE(s) ——310

Implicitly indicating to UE(s) the processing time capability associated with a PDSCH by scheduling corresponding PUCCH with timing gap according to the threshold ——320

IMPLICIT USER EQUIPMENT PROCESSING TIME INDICATION AND DETERMINATION FOR SUPPORT OF DIFFERENT PROCESSING TIMES IN ULTRA-RELIABLE LOW-LATENCY COMMUNICATION (URLLC)

CROSS-REFERENCE TO RELATED APPLICATIONS

This application claims priority from U.S. provisional patent application No. 62/932,781 filed on Nov. 8, 2019. The contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for the indication and determination of the user equipment (UE) processing time capability when different processing time capabilities are supported on a carrier.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

One embodiment is directed to a method that may include determining a threshold used for determining a processing time capability for at least one user equipment. The method may also include implicitly indicating, to the at least one user equipment, the processing time capability associated with a physical downlink shared channel (PDSCH) by scheduling the corresponding physical uplink control channel (PUCCH) with a timing gap that takes the threshold into account.

An embodiment is directed to a method that may include determining a threshold used for determining a processing time capability for at least one user equipment. The method may also include implicitly indicating, to the at least one user equipment, the processing time capability associated with a physical uplink shared channel (PUSCH) by scheduling the corresponding physical downlink control channel (PDCCH) with a timing gap that takes the threshold into account.

An embodiment is directed to an apparatus, which may include at least one processor and at least one memory comprising computer program code. The at least one memory and computer program code may be configured, with the at least one processor, to cause the apparatus at least to determine a threshold used for determining a processing time capability for at least one user equipment, and to implicitly indicate, to the at least one user equipment, the processing time capability associated with a physical downlink shared channel (PDSCH) by scheduling the corresponding physical uplink control channel (PUCCH) with a timing gap that takes the threshold into account.

An embodiment is directed to an apparatus, which may include at least one processor and at least one memory comprising computer program code. The at least one memory and computer program code may be configured, with the at least one processor, to cause the apparatus at least to determine a threshold used for determining a processing time capability for at least one user equipment, and to implicitly indicate, to the at least one user equipment, the processing time capability associated with a physical uplink shared channel (PUSCH) by scheduling the PUSCH with a corresponding physical downlink control channel (PDCCH) with a timing gap that takes the threshold into account.

An embodiment is directed to an apparatus that may include means for determining a threshold used for determining a processing time capability for at least one user equipment. The apparatus may also include means for implicitly indicating, to the at least one user equipment, the processing time capability associated with a physical downlink shared channel (PDSCH) by scheduling the corresponding physical uplink control channel (PUCCH) with a timing gap that takes the threshold into account, or means for implicitly indicating, to the at least one user equipment, the processing time capability associated with a physical uplink shared channel (PUSCH) by scheduling the PUSCH with a corresponding physical downlink control channel (PDCCH) with a timing gap that takes the threshold into account.

In a variant, the method may include or the apparatus may be controlled to inform the at least one user equipment about the threshold used for determining the processing time capability for the at least one user equipment.

In a variant, the informing may include informing the at least one user equipment about the threshold via at least one of higher layer signaling or radio resource control (RRC) configuration.

In a variant, the threshold is defined as number of symbols or in milliseconds.

In a variant, a minimum value of the threshold comprises a minimum processing time of a slower user equipment processing time capability 1. In one variant, the threshold is set as a minimum processing time of a slower user equipment processing time capability 1.

In a variant, the determining of the processing time capability may further include adjusting the threshold based on at least one of a frequency of traffic or the at least one user equipment's power status.

An embodiment may be directed to a method that may include a user equipment receiving or determining a threshold used for determining a processing time capability for the user equipment. For a physical downlink shared channel (PDSCH), the method may include determining a timing gap between a last symbol of the physical downlink shared channel (PDSCH) and a first symbol of an associated physical uplink control channel (PUCCH) resource. When the timing gap is less than the threshold, the method may include processing the physical downlink shared channel (PDSCH) with a faster processing time capability 2 and, when the timing gap is not less than the threshold, the method may include processing the physical downlink shared channel (PDSCH) with the slower processing time capability 1.

An embodiment is directed to a method that may include a user equipment receiving or determining a threshold used for determining a processing time capability for the user equipment. For a physical uplink shared channel (PUSCH), the method may include determining a timing gap between a last symbol of a physical downlink control channel (PDCCH) scheduling the physical uplink shared channel (PUSCH) and a first symbol of the scheduled physical uplink shared channel (PUSCH). When the timing gap is less than the threshold, the method may include processing the physical uplink shared channel (PUSCH) with a faster processing time capability 2 and, when the timing gap is not less than the threshold, the method may include processing the physical uplink shared channel (PUSCH) with the slower processing time capability 1.

An embodiment is directed to an apparatus, which may include at least one processor and at least one memory comprising computer program code. The at least one memory and computer program code may be configured, with the at least one processor, to cause the apparatus at least to receive or determine a threshold used for determining a processing time capability for at least one user equipment, for a physical downlink shared channel (PDSCH), to determine a timing gap between a last symbol of the physical downlink shared channel (PDSCH) and a first symbol of an associated physical uplink control channel (PUCCH) resource. When the timing gap is less than the threshold, process the physical downlink shared channel (PDSCH) with a faster processing time capability 2 and, when the timing gap is not less than the threshold, process the physical downlink shared channel (PDSCH) with the slower processing time capability 1.

An embodiment is directed to an apparatus, which may include at least one processor and at least one memory comprising computer program code. The at least one memory and computer program code are configured, with the at least one processor, to cause the apparatus at least to receive or determine a threshold used for determining a processing time capability for at least one user equipment and, for a physical uplink shared channel (PUSCH), to determine a timing gap between a last symbol of a physical downlink control channel (PDCCH) scheduling the physical uplink shared channel (PUSCH) and a first symbol of the scheduled physical uplink shared channel (PUSCH). When the timing gap is less than the threshold, process the physical uplink shared channel (PUSCH) with a faster processing time capability 2 and, when the timing gap is not less than the threshold, process the physical uplink shared channel (PUSCH) with the slower processing time capability 1.

An embodiment is directed to an apparatus that may include means for receiving or determining a threshold used for determining a processing time capability for at least one user equipment. For a physical downlink shared channel (PDSCH), the apparatus may include means for determining a timing gap between a last symbol of the physical downlink shared channel (PDSCH) and a first symbol of an associated physical uplink control channel (PUCCH) resource. When the timing gap is less than the threshold, the apparatus may include means for processing the physical downlink shared channel (PDSCH) with a faster processing time capability 2. When the timing gap is not less than the threshold, the apparatus may include means for processing the physical downlink shared channel (PDSCH) with the slower processing time capability 1.

An embodiment is directed to an apparatus that may include means for receiving or determining a threshold used for determining a processing time capability for at least one user equipment. For a physical uplink shared channel (PUSCH), the apparatus may include means for determining a timing gap between a last symbol of a physical downlink control channel (PDCCH) scheduling the physical uplink shared channel (PUSCH) and a first symbol of the scheduled physical uplink shared channel (PUSCH). When the timing gap is less than the threshold, the apparatus may include means for processing the physical uplink shared channel (PUSCH) with a faster processing time capability 2. When the timing gap is not less than the threshold, the apparatus may include means for processing the physical uplink shared channel (PUSCH) with the slower processing time capability 1.

In a variant, the threshold is at least one of a pre-defined threshold, radio resource control configured threshold, or threshold received through higher layer signaling or a radio resource control configuration from a network node.

In a variant, the threshold is defined as number of symbols or in milliseconds.

In a variant, a minimum value of the threshold comprises a minimum processing time of a slower user equipment processing time capability 1. In one variant, the threshold is set as a minimum processing time of a slower user equipment processing time capability 1.

In a variant, for a physical downlink shared channel (PDSCH) with associated downlink control information (DCI), the determining of the timing gap comprises determining the timing gap based on the downlink control information (DCI) content.

In another variant, for a physical downlink shared channel (PDSCH) without associated downlink control information (DCI), the determining of the timing gap comprises determining the timing gap based on the semi-persistent scheduling (SPS) configuration and the information in the semi-persistent scheduling (SPS) activation downlink control information (DCI).

Another embodiment is directed to an apparatus that may include circuitry configured to perform the method according to the example embodiments discussed above and/or any other embodiments discussed herein, or any of the variants described above or elsewhere herein.

Another embodiment is directed to an apparatus that may include means for performing the method according to the example embodiments discussed above and/or any other embodiments discussed herein, or any of the variants described above or elsewhere herein.

Another embodiment is directed to a non-transitory computer readable medium comprising program instructions stored thereon for performing at least the method according to the example embodiments discussed above and/or any other embodiments discussed herein, or any of the variants described above or elsewhere herein.

BRIEF DESCRIPTION OF THE DRAWINGS

For proper understanding of example embodiments, reference should be made to the accompanying drawings, wherein.

DETAILED DESCRIPTION

Figure 1:
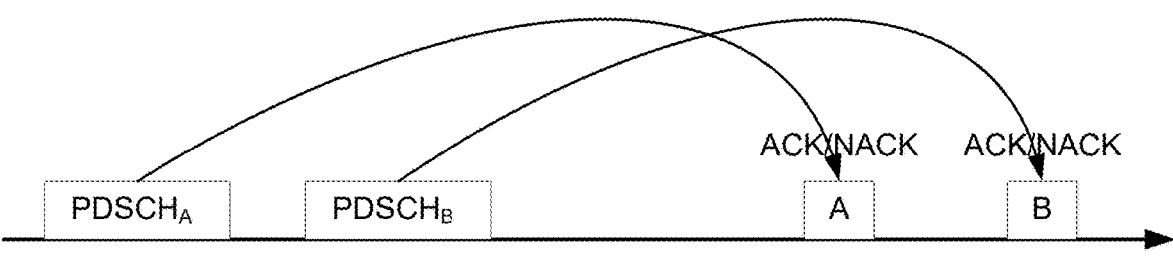
FIG. 1 illustrates an example diagram of in-order HARQ-ACK feedback.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for the indication and determination of the required user equipment processing time capability when different processing time capabilities are supported on a carrier, e.g., for the purpose of power saving and/or simplified implementation, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

In 3GPP Release-15, two UE processing time capabilities, a slower UE processing time capability and a faster UE processing time capability, are defined for the processing of physical downlink shared channel (PDSCH). The slower UE processing time capability may be referred to as capability 1 (cap #1) and the minimum processing time associated with this capability may be denoted by $N1_{cap1}$ (symbols). The faster UE processing time capability may be referred to as capability 2 (cap #2) and the minimum processing time associated with this capability may be denoted by $N1_{cap2}$ (symbols, $<N1_{cap1}$). In Release-15, a serving cell is configured with either capability 1 or capability 2 for all the transmissions and receptions on the cell (possibly with some exceptions).

In 3GPP Release-16, it has been proposed to support both capability 1 and capability 2 on the same serving cell. Generally speaking, for a UE capable of capability 2, it can still be beneficial for the UE to save power by processing some PDSCHs with capability 1 when latency allows. In other words, the UE can adjust its processing clock to process the PDSCH slower, with longer processing time but less power consumption. In addition, it can make the support of certain features easier from a UE implementation point of view, and out-of-order (OoO) hybrid automatic repeat request (HARQ)-acknowledgement (ACK) is one such example feature, which will be explained in more detail in the following. To support mixed capability 1 and capability 2 on the same serving cell, there is a need to provide a mechanism for the UE to determine the required processing time capability for each PDSCH.

3GPP Release-16 enhancements for URLLC may include providing support for OoO HARQ-ACK, for which the support of different processing time capabilities on the same carrier may allow an easier implementation. For example, as will be discussed in detail in the following, certain embodiments may relate to OoO HARQ-ACK associated with physical downlink shared channels (PDSCHs) with different HARQ process identifiers (IDs) on a given carrier.

In NR Release-15, the HARQ-ACK messages associated with two consecutive PDSCHs on a given carrier must be sent in the order the corresponding PDSCH is received. FIG. 1 illustrates an example of the in-order HARQ-ACK feedback according to the Release-15 behavior. As illustrated in FIG. 1, ACK/NACK$_A$ of the earlier transmitted PDSCH$_A$ is transmitted first, even if ACK/NACK$_B$ of a later transmitted PDSCH$_B$ is ready to be transmitted before the transmission of ACK/NACK$_A$.

Figure 2:
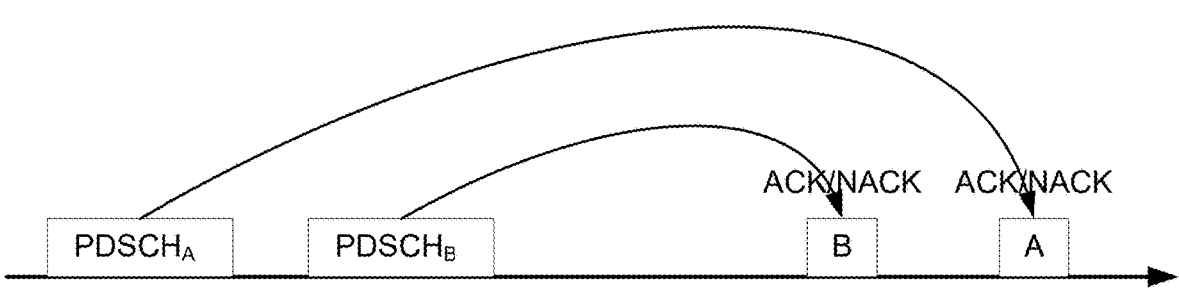
FIG. 2 illustrates an example diagram of out-of-order HARQ-ACK, according to an embodiment.

However, there is latency gain for URLLC by allowing the HARQ-ACK of the later received PDSCH to be transmitted before HARQ-ACK of the early received PDSCH. For example, this may be the case when the PDSCH$_B$ is conveying latency critical URLLC traffic, which would require a quick HARQ-ACK feedback. FIG. 2 illustrates an example of OoO HARQ-ACK, according to an embodiment. In this example, there can be latency gain for URLLC by allowing the HARQ-ACK$_B$ of PDSCH$_B$ to be transmitted before HARQ-ACK$_A$ of PDSCH$_A$, which results in the OoO HARQ-ACK operation, as illustrated in the example of FIG. 2.

As to the HARQ-ACK messages associated with multiple consecutive PDSCHs communicated on the same carrier, it has been noted that there is a pipelining mismatch at the UE for the processing of the two PDSCHs (i.e., the same processing block might be required for the processing of PDSCH$_A$ and PDSCH$_B$ at the same time) when the two PDSCHs are processed with different processing capabilities. The pipelining issue does not exist if the two PDSCHs are processed with the same processing capability.

Generally, when a capability 2 UE receives a PDSCH, it could be beneficial for the UE to save power by processing the PDSCH with capability 1, if there is sufficient time between the PDSCH transmission and the associated HARQ-ACK transmission (i.e., PDSCH-to-ACK/NACK is long enough). In other words, the UE can adjust its processing clock to process the PDSCH slower, with longer processing time but less power consumption. When the HARQ-ACKs are in-order, as depicted in FIG. 1, the UE can decide to process $PDSCH_A$ with cap #1 if the timing $PDSCH_A$-to-ACK/$NACK_A$ is long enough, e.g., greater than $N1_{cap1}+N1_{cap2}$, and this is up to the UE implementation. In this case, ACK/$NACK_B$ is needed after ACK/$NACK_A$ so that, based on the timing $PDSCH_B$-to-ACK/$NACK_B$, the UE can decide whether it should process $PDSCH_B$ with cap #1 by pipelining or wait until the processing of $PDSCH_A$ has finished and process $PDSCH_B$ with cap #2 if needed (no pipelining issue in both cases).

In the context of OoO HARQ-ACK, as depicted in FIG. 2, ACK/$NACK_B$ is needed to be transmitted before ACK/$NACK_A$ and it is most likely that the timing $PDSCH_B$-to-ACK/$NACK_B$ is set (close) to $N1_{cap2}$. Hence, the UE needs to process $PDSCH_B$ with cap #2 immediately whenever it arrives. In this case, the UE can only process $PDSCH_A$ with cap #1 without pipelining issue if $PDSCH_B$ is scheduled $N1_{cap1}$ symbols after $PDSCH_A$. However, the UE does not know in advance when $PDSCH_B$ is going to be scheduled when starting the processing of $PDSCH_A$. In this case, the UE can relax the processing time of $PDSCH_A$ to cap #1 only if it receives an indication from the gNB that it can process the PDSCH with slower cap #1 (and the gNB should avoid scheduling $PDSCH_B$ within $N1_{cap1}$ symbols after $PDSCH_A$ accordingly, otherwise the UE can drop the processing of $PDSCH_A$). This processing time indication is also beneficial even for the case of in-order HARQ-ACKs, such that the UE does not need to apply any implementation rule (as described above) to deduce whether the PDSCH could be processed with cap #1 or should be processed with cap #2. Thus, a problem that arises is how a gNB can indicate the minimum processing time associated (i.e., cap #1 or cap #2) with each PDSCH.

As it is currently under consideration that different UE processing capabilities can be configured on the same serving cell, there is a need for a method of indicating the processing capabilities.

More specifically, 3GPP has discussed the case where both minimum processing timeline Capability #1 and Capability #2 for a UE can be configured on a given carrier and different PDSCHs can be associated with different minimum processing timeline on a given carrier. A subset of this case (which may be referred to as case 1) is where the UE processes both PDSCHs without dropping when they are non-overlapping or overlapping. Another subset of the case (which may be referred to as case 2) is where the UE may perform differently depending on whether the PDSCHs are overlapping or not. For example, if the two PDSCHs are non-overlapping, the UE processes the PDSCH associated with capability 2 and processes the PDSCH associated with capability 1 if its last symbol is at least $N1_{cap1}$ symbols before the start of the PDSCH associated with capability 2. Otherwise, the UE may skip decoding the PDSCH associated with capability 1 and HARQ-ACK should be reported for the PDSCH associated with capability 1. However, if the two PDSCHs are overlapping, the UE processes the high priority PDSCH and may skip decoding the low priority PDSCH. In this situation, the two unicast PDSCHs may be scheduled by respective PDCCHs with different starting symbols, and an explicit PDSCH priority indication may be supported for this case (i.e., case 2), for example, via a bit in the DCI, different RNTIs for CRC scrambling, different non-overlapping search spaces, different CORESETs and DCI formats with different sizes. For instance, the explicit indication can be configured and, if absent, the PDSCH that is scheduled by a PDCCH with the later starting symbol may be considered of higher priority. However, in this case, there is a need for considering how the association of the PDSCHs to the corresponding UE minimum processing time is determined.

Thus, certain embodiments provide a method for how a network node (e.g., base station or gNB) can indicate the processing capability associated with each of PDSCHs communicated on the same carrier, so that the UE can determine which one of the (faster/slower) processing capabilities to be used for processing the corresponding PDSCHs received at the UE. It is noted that certain embodiments described herein may relate to the case where a single processing chain is used to process both PDSCHs.

Further, it should be noted that, while certain embodiments described herein may relate to the determination and/or indication of UE processing time capability for downlink, example embodiments can also be applied to determine and/or indicate the UE processing time capability for uplink. In other words, according to some embodiments, the UE processing time capability determination and/or indication may be for downlink and/or uplink. The threshold for downlink and uplink may be the same or may be different.

Certain embodiments may be configured to use PDSCH-to-HARQ-ACK timing gap and a configured threshold value to determine the expected processing capability associated with each of the PDSCHs communicated on the same carrier. In an embodiment, the threshold value may be configured by a network node (e.g., gNB) and signaled to a UE by higher layer signaling (e.g., RRC configuration). In another embodiment, the threshold value may be pre-determined. In some embodiments, by comparing PDSCH-to-HARQ-ACK timing gap to the threshold value, the UE may determine a specific processing capability for each of PDSCHs received on the same carrier. For example, when the PDSCH-to-HARQ-ACK timing gap between the end of a PDSCH and the start of the associated HARQ-ACK resources designated to carry HARQ-ACK for this PDSCH is smaller than the threshold value, the UE may use a faster UE processing capability to process the PDSCH. Otherwise, the UE may select a slower UE processing capability for the processing of the PDSCH.

As discussed above, certain embodiments may also be applied for uplink. For example, for the uplink, the UE may determine processing time capability for physical uplink shared channel (PUSCH) based on the timing gap between the end of a PDCCH and the start of the PUSCH scheduled by the PDCCH. The timing gap may then be used to compare with the threshold. The threshold for the determination of the processing time capability for the physical uplink shared channel (PUSCH) may be the same or different from the threshold for the determination of the processing time capability for the physical downlink shared channel (PDSCH).

More specifically, in one embodiment, a gNB may be configured to implicitly indicate, and a UE may implicitly determine, the expected processing capability associated with each PDSCH based on the timing gap between the end of a PDSCH and the start of the indicated PUCCH resource. According to certain embodiments, when the timing gap between then end of a PDSCH and the start of the indicated PUCCH resource is smaller than a threshold, that PDSCH may be expected to be processed with capability 2 at the UE. Otherwise, the PDSCH may be expected to be processed with capability 1.

From the UE perspective, in some embodiments, a UE may be configured to determine a threshold used for determining the processing capability. For instance, according to an embodiment, the threshold may be pre-defined in specifications, and/or may be indicated through higher layer signaling by a gNB (e.g., RRC configuration). In some embodiments, the threshold can be defined as number of orthogonal frequency division multiplexing (OFDM) symbols or in milliseconds. According to certain embodiments, the minimum value of the threshold can be the minimum processing time of UE processing capability 1 (i.e., $N1_{cap1}$ symbols or $T_{proc1}$ milliseconds), which could be set as a default value for the threshold. In case $T_{proc1}$ is used, additional processing time, such as $d_{1,1}$, may take either zero, or its maximum value for the calculation of $T_{proc1}$, or a value configured by the gNB.

According to an embodiment, for a PDSCH, the UE may be configured to determine the timing gap between the last symbol of the PDSCH and the first symbol of the associated physical uplink control channel (PUCCH) resource for HARQ-ACK transmission. For a PDSCH with associated downlink control information (DCI), this can be determined based on the DCI content. For a PDSCH without associated DCI (i.e., PDSCH with semi-persistent scheduling (SPS)), this can be determined based on the SPS configuration and the information in the SPS activation DCI. In an embodiment, if the timing gap is smaller than the threshold, the UE may be configured to process the PDSCH with capability 2; otherwise, if the timing gap is not smaller than the threshold, the UE may be configured to process the PDSCH with capability 1.

From the perspective of the network, in an embodiment, a network node, such as a gNB, may inform a UE about the threshold for the processing time assumption. According to some embodiments, the gNB may inform the UE about the threshold by higher layer signaling (e.g., RRC configuration). In certain embodiments, the threshold may be defined as the number of OFDM symbols or in milliseconds. As mentioned above, according to an embodiment, the minimum value of the threshold can be the minimum processing time of UE processing capability 1 (i.e., $N1_{cap1}$ symbols or $T_{proc1}$ milliseconds), which could be set as a default value for the threshold. In case $T_{proc1}$ is used, additional processing time, such as $d_{1,1}$, should take either zero, or its maximum value for the calculation of $T_{proc1}$, or a value configured by gNB. In certain embodiments, the threshold may be adjusted by the gNB based on the user and/or cell traffic (whether the URLLC traffic is frequent or not) and/or the UE's power status.

According to an embodiment, the gNB may be configured to implicitly indicate, to the UE, the processing capability associated with a PDSCH by scheduling the corresponding PUCCH with a timing gap that takes the threshold into account, as described above. It is noted that, in some embodiments, there may be exceptions where a PDSCH satisfying certain condition(s) is processed with capability 1, e.g., a PDSCH with additional demodulation reference signals (DMRS).

As one example, where K denotes the timing between the last symbol of a PDSCH and the first symbol of the associated PUCCH resource for HARQ-ACK transmission indicated by the same DCI, for a PDSCH sent to a processing capability 2 UE, the UE may determine the corresponding processing time for that PDSCH based on the following pseudo code:

```
Preconfiguring a Threshold ≥ N1_cap1 (e.g. Threshold= N1_cap1 by
default)
If there is additional DMRS
    the PDSCH is processed with cap#1
Elseif K≥Threshold
    the PDSCH is processed with cap#1
Else
    the PDSCH is processed with cap#2
End
```

According to some embodiments, the higher the threshold, the lower possibility for the PDSCHs to be processed with capability 1. Therefore, by adjusting the threshold, a gNB can control the trade-off between power saving and pipelining alignment at the UE.

It should be noted that the actual PUCCH resource to carry HARQ-ACK for a PDSCH may be changed afterwards by other PDSCH scheduling. However, for the purposes of determining the processing capability, the PUCCH resource indicated in the DCI may be used in the procedure described above. In case the actual PUCCH resource changes, the gNB can make sure that the time gap does not go from above the threshold (based on the indicated PUCCH resource in DCI, cap #1) to below the threshold (based on the actual PUCCH resource, cap #2). Otherwise, the UE may drop the processing of the PDSCH.

Figure 3A:
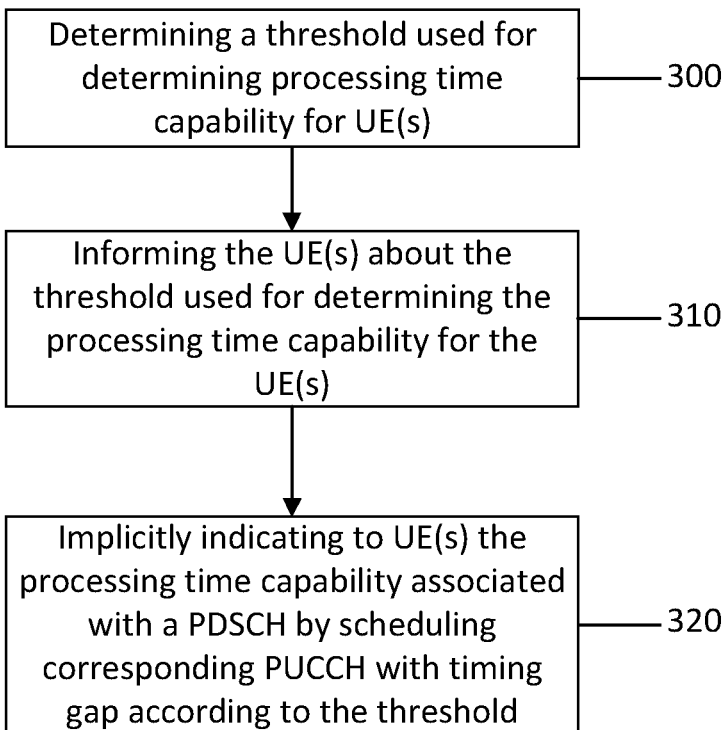
FIG. 3a illustrates an example flow diagram of a method, according to an embodiment.

FIG. 3a illustrates an example flow diagram of a method of determining and/or indicating UE processing time capability, according to one example embodiment. In certain example embodiments, the flow diagram of FIG. 3a may be performed by a network entity or network node associated with a communication system, such as LTE or 5G NR. For instance, in some example embodiments, the network node performing the method of FIG. 3a may include a base station, eNB, gNB, and/or NG-RAN node.

As illustrated in the example of FIG. 3a, the method may include, at 300, determining a threshold used for determining a processing time capability for one or more UE(s). In certain embodiments, the threshold may be defined as number of OFDM symbols or in milliseconds. According to an embodiment, a minimum value of the threshold may include the minimum processing time of the slower UE processing capability 1 (i.e., $N1_{cap1}$ symbols or $T_{proc1}$ milliseconds). In one embodiment, this minimum value may be set as a default value for the threshold. In certain embodiments, the determining 300 may include adjusting the threshold based on the frequency of traffic (e.g., whether the URLLC traffic is frequent or not) and/or based on the UE's power status.

According to some embodiments, the method of FIG. 3a may also include, at 310, informing or signaling, to the one or more UE(s), the threshold used for determining the processing time capability for the UE(s). In an embodiment, the informing 310 may include informing the UE(s) about the threshold via higher layer signaling (e.g., RRC configuration). In certain embodiments, if the threshold is pre-defined by specifications, then the procedures of determining 300 and informing 310 may be optional.

According to an embodiment, the method of FIG. 3a may further include, at 320, implicitly indicating, to the UE(s), the processing capability associated with a PDSCH by scheduling the corresponding PUCCH with a timing gap taking the threshold into account. As noted above, in some embodiments, there may be exceptions where a PDSCH satisfying certain condition(s) is processed with capability 1, e.g., a PDSCH with additional demodulation reference signals (DMRS).

Figure 3B:
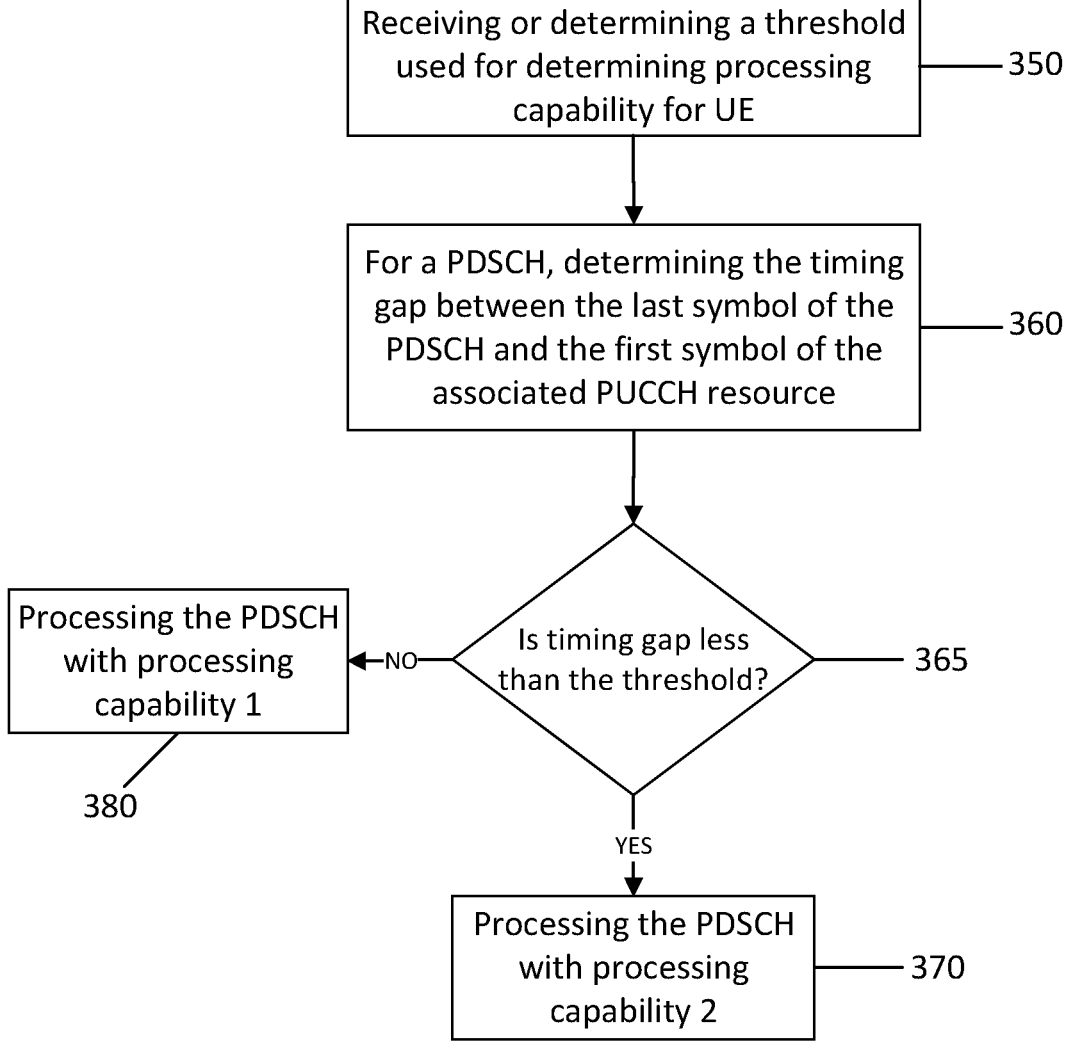
FIG. 3b illustrates an example flow diagram of a method, according to an embodiment.

FIG. 3b illustrates an example flow diagram of a method for determining and/or indicating UE processing time capability, according to one example embodiment. In certain example embodiments, the flow diagram of FIG. 3b may be performed by a network entity or network node associated with a communications system, such as LTE or 5G NR. For instance, in some example embodiments, the network entity performing the method of FIG. 3b may be a UE, mobile station, IoT device, or the like.

In an embodiment, the method of FIG. 3b may include, at 350, receiving or determining a threshold used for determining a processing capability for the UE. For instance, according to an embodiment, the threshold may be predefined in specifications, and/or may be received through higher layer signaling (e.g., RRC configuration) from a network node (e.g., gNB). In some embodiments, the threshold may be defined as number of OFDM symbols or in milliseconds. According to certain embodiments, a minimum value of the threshold may be the minimum processing time of the slower UE processing capability 1 (i.e., $N1_{cap1}$ symbols or $T_{proc1}$ milliseconds). In an embodiment, this minimum value may be set as a default value for the threshold.

According to an embodiment, the method of FIG. 3b may include, at 360, for a PDSCH, determining the timing gap between the last symbol of the PDSCH and the first symbol of the associated PUCCH resource. For a PDSCH with associated DCI, the determining 360 may include determining the timing gap based on the scheduling DCI content. For a PDSCH without associated DCI, the determining 360 may include determining the timing gap based on the SPS configuration and the information in the SPS activation DCI. In an embodiment, the method may include, at 365, comparing the determined timing gap to the threshold to determine whether the timing gap is less than the threshold. According to an embodiment, if the timing gap is less than the threshold, the method may include, at 370, processing the PDSCH with the faster processing capability 2. If the timing gap is not less than the threshold, the method may include, at 380, processing the PDSCH with the slower processing capability 1.

Figures 4A, 4B:
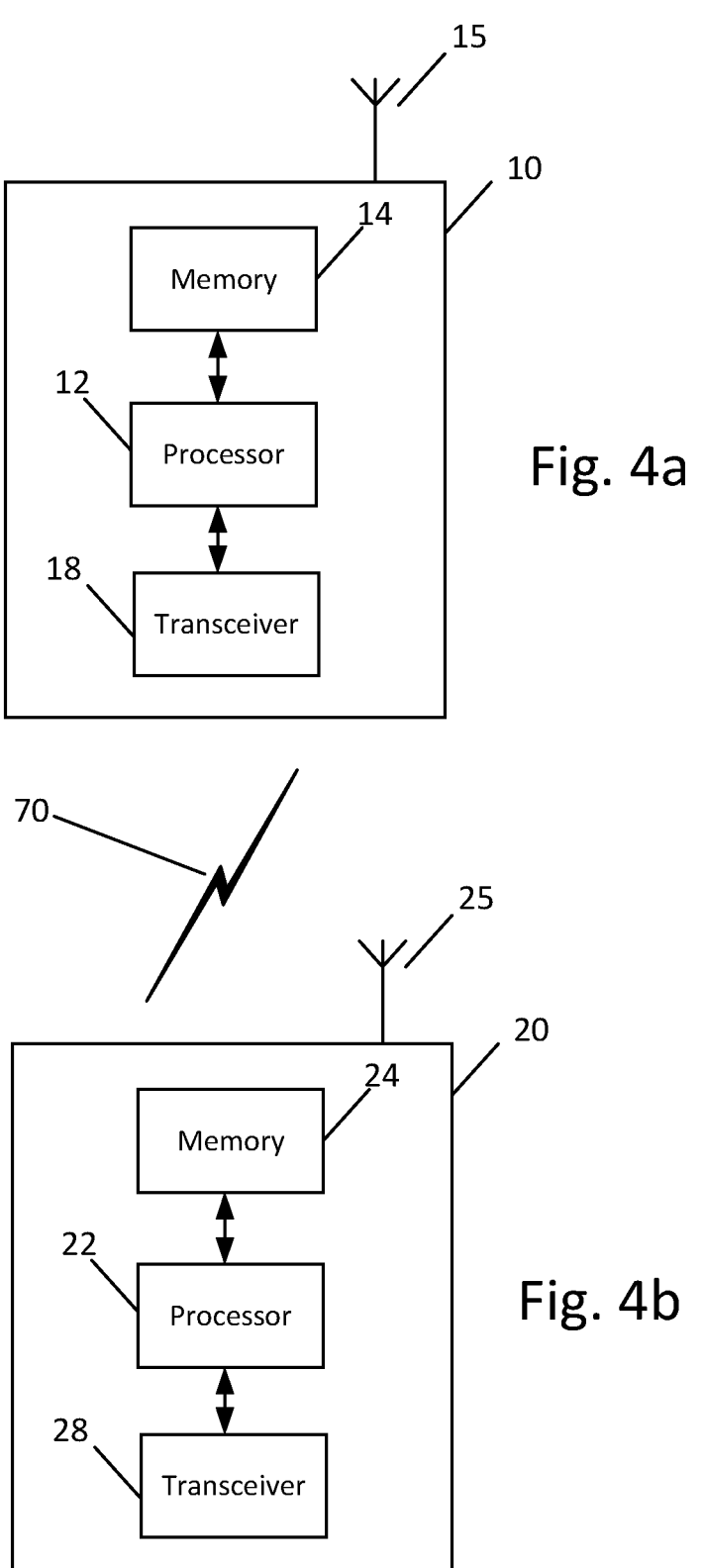
FIG. 4a illustrates an example block diagram of an apparatus, according to an embodiment.
FIG. 4b illustrates an example block diagram of an apparatus, according to an embodiment.

FIG. 4a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be NG-RAN node, an eNB in LTE, or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. For example, in some embodiments, apparatus 10 may be configured to perform one or more of the processes depicted in any of the flow charts or signaling diagrams described herein, such as those illustrated in FIG. 1, 2, 3a or 3b. In some embodiments, as discussed herein, apparatus 10 may be configured to perform a procedure relating to determining and/or indicating UE processing time capability.

According to certain embodiments, apparatus 10 may be controlled by memory 14 and processor 12 to determine a threshold used for determining a processing time capability for one or more UE(s). In certain embodiments, the threshold may be defined as number of OFDM symbols or in milliseconds. According to an embodiment, a minimum value of the threshold may include the minimum processing time of the slower UE processing capability 1. In one embodiment, this minimum value may be set as a default value for the threshold. In certain embodiments, apparatus 10 may be controlled by memory 14 and processor 12 to adjust the threshold based on the frequency of traffic (e.g., whether the URLLC traffic is frequent or not) and/or based on the UE's power status.

According to some embodiments, apparatus 10 may be controlled by memory 14 and processor 12 to inform or signal, to the one or more UE(s), the threshold used for determining the processing time capability of for the UE(s). In an embodiment, apparatus 10 may be controlled by memory 14 and processor 12 to inform the UE(s) about the threshold via higher layer signaling (e.g., RRC configuration). According to some embodiments, if the threshold is pre-defined by specifications, then the procedures of apparatus 10 of determining and informing or signaling the threshold may be optional.

According to an embodiment, apparatus 10 may be controlled by memory 14 and processor 12 to implicitly indicate, to the UE(s), the processing capability associated with a PDSCH by scheduling the corresponding PUCCH with a timing gap that takes the threshold into consideration. As noted above, in some embodiments, there may be exceptions where a PDSCH satisfying certain condition(s) is processed with capability 1, e.g., a PDSCH with additional demodulation reference signals (DMRS).

FIG. 4b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 1, 2, 3*a* or 3*b*. In certain embodiments, apparatus 20 may include or represent a UE and may be configured to perform a procedure relating to supporting OoO HARQ-ACK associated with PDSCHs with different HARQ process IDs on the same carrier, for instance.

In certain embodiments, apparatus 20 may be controlled by memory 24 and processor 22 to receive or determine a threshold used for determining a processing time capability for the UE. For instance, according to an embodiment, the threshold may be pre-defined in specifications, may be RRC configured, and/or may be received at apparatus 20 through higher layer signaling from a network node (e.g., gNB). In some embodiments, the threshold may be defined as number of OFDM symbols or in milliseconds. According to certain embodiments, a minimum value of the threshold may be the minimum processing time of the slower UE processing capability 1 (i.e., $N1_{cap1}$_symbols or $T_{proc1}$ milliseconds). In an embodiment, this minimum value may be set as a default value for the threshold.

According to an embodiment, apparatus 20 may be controlled by memory 24 and processor 22 to, for a PDSCH, determine the timing gap between the last symbol of the PDSCH and the first symbol of the associated PUCCH resource. For a PDSCH with associated DCI, apparatus 20 may be controlled by memory 24 and processor 22 to determine the timing gap based on the scheduling DCI content. For a PDSCH without associated DCI, apparatus 20 may be controlled by memory 24 and processor 22 to determine the timing gap based on the SPS configuration and the information in the SPS activation DCI. In an embodiment, apparatus 20 may be controlled by memory 24 and processor 22 to compare the determined timing gap with the threshold and to determine whether the timing gap is less than the threshold. According to an embodiment, if the timing gap is less than the threshold, apparatus 20 may be controlled by memory 24 and processor 22 to process the PDSCH with the faster processing capability 2. If the timing gap is not less than the threshold, apparatus 20 may be controlled by memory 24 and processor 22 to process the PDSCH with the slower processing capability 1.

Therefore, certain example embodiments provide several technological improvements, enhancements, and/or advantages over existing technological processes and constitute an improvement at least to the technological field of wireless network control and management. For example, certain embodiments may use PDSCH-to-HARQ-ACK timing gap and a configurable threshold value to determine the expected processing capability associated with each of PDSCHs on the same carrier. As a result, example embodiments enable a network node, such as a gNB, to control the trade-off between power saving and pipelining alignment at the UE for the processing of PDSCHs with different processing capabilities on the same carrier. Additionally, example embodiments do not require the introduction of a dedicated field for the indication of the applicable processing time in the DCI scheduling PDSCH. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

What is claimed is:

1. An apparatus, comprising:
   at least one processor; and
   at least one memory comprising computer program code,
   the at least one memory and computer program code are configured, with the at least one processor, to cause the at least one processor at least to:
      determine a threshold used for determining a processing time capability for at least one user equipment;
      for a first physical downlink shared channel (PDSCH), determine a first timing gap between a last symbol of the first PDSCH and a first symbol of an associated physical uplink control channel (PUCCH) resource;
      when the first timing gap is less than the threshold, process the first PDSCH with a faster processing time capability 2;
      when the first timing gap is not less than the threshold, process the) first PDSCH with the slower processing time capability 1;
      for a second PDSCH without associated downlink control information (DCI), determine a second timing gap based on the semi-persistent scheduling (SPS) configuration and the information in the semi-persistent scheduling (SPS) activation DCI;
      when the second timing gap is less than the threshold, process the second PDSCH with a faster processing time capability 2; and
      when the second timing gap is not less than the threshold, process the second PDSCH with the slower processing time capability 1.

2. The apparatus according to claim 1, wherein the threshold is received through higher layer signaling or a radio resource control configuration from a network node.

3. The apparatus according to claim 2, wherein the threshold is defined as number of symbols.

4. The apparatus according to claim 3, wherein a minimum value of the threshold comprises a minimum processing time of a slower user equipment processing time capability 1.

\* \* \* \* \*